US012725841B2

(12) United States Patent
Kang et al.

(10) Patent No.: US 12,725,841 B2
(45) Date of Patent: Sep. 1, 2026

(54) STACK CELL FOR EASY CONFIRMATION OF SEPARATOR FOLDING, SEPARATOR INSPECTION DEVICE AND INSPECTION METHOD

(71) Applicant: LG Energy Solution, Ltd., Seoul (KR)

(72) Inventors: Joon Sup Kang, Daejeon (KR); Nak Gi Sung, Daejeon (KR); Sung Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 141 days.

(21) Appl. No.: 18/728,116

(22) PCT Filed: Dec. 19, 2023

(86) PCT No.: PCT/KR2023/020976
§ 371 (c)(1),
(2) Date: Jul. 11, 2024

(87) PCT Pub. No.: WO2024/136400
PCT Pub. Date: Jun. 27, 2024

(65) Prior Publication Data

US 2025/0105378 A1 Mar. 27, 2025

(30) Foreign Application Priority Data

Dec. 19, 2022 (KR) ........................ 10-2022-0178139

(51) Int. Cl.
*H01M 10/04* (2006.01)
*G01N 23/04* (2018.01)
(Continued)

(52) U.S. Cl.
CPC ........ *H01M 10/4285* (2013.01); *G01N 23/04* (2013.01); *G01N 23/18* (2013.01);
(Continued)

(58) Field of Classification Search
CPC ......... H01M 10/4285; H01M 10/0459; H01M 50/466; H01M 10/0436; H01M 10/0585;
(Continued)

(56) References Cited

U.S. PATENT DOCUMENTS

2009/0081535 A1 3/2009 Zhang
2018/0131009 A1* 5/2018 Suehiro ............... H01M 50/186
(Continued)

FOREIGN PATENT DOCUMENTS

CN 101393018 A 3/2009
JP 2010177068 A 8/2010
(Continued)

OTHER PUBLICATIONS

International Search Report for Application No. PCT/KR2023/020976 mailed Mar. 26, 2024, pp. 1-3.

*Primary Examiner* — Uzma Alam
*Assistant Examiner* — Mamadou Faye
(74) *Attorney, Agent, or Firm* — Lerner David LLP

(57) ABSTRACT

A stack cell for easy confirmation of separator folding, includes a plurality of electrodes, a separator disposed between two adjacent electrodes, and a mark formed of a radio-opaque material through which no radiation ray is transmitted, and provided at an edge region of the separator, where the folding of the separator can be easily determined through the position information of the mark through which no radiation ray is transmitted.

14 Claims, 4 Drawing Sheets

(51) Int. Cl.
*G01N 23/18* (2018.01)
*H01M 10/42* (2006.01)
*H01M 50/466* (2021.01)

(52) U.S. Cl.
CPC ..... *H01M 10/0459* (2013.01); *H01M 50/466* (2021.01); *G01N 2223/04* (2013.01); *G01N 2223/646* (2013.01)

(58) Field of Classification Search
CPC .... H01M 50/409; H01M 10/04; G01N 23/04; G01N 23/18; G01N 2223/04; G01N 2223/646; G01N 2223/401; Y02E 60/10
See application file for complete search history.

(56) References Cited

U.S. PATENT DOCUMENTS

| | | | | |
|---|---|---|---|---|
| 2023/0074096 | A1* | 3/2023 | Oh | H01M 50/557 |
| 2024/0243281 | A1* | 7/2024 | Kaufman | H01M 10/0583 |

FOREIGN PATENT DOCUMENTS

| | | | |
|---|---|---|---|
| JP | 2012142206 | A | 7/2012 |
| JP | 2017054813 | A | 3/2017 |
| JP | 2018087740 | A | 6/2018 |
| JP | 2019067645 | A | 4/2019 |
| KR | 102248231 | B1 | 5/2021 |
| KR | 20220094584 | A | 7/2022 |

* cited by examiner

[Figure 1]
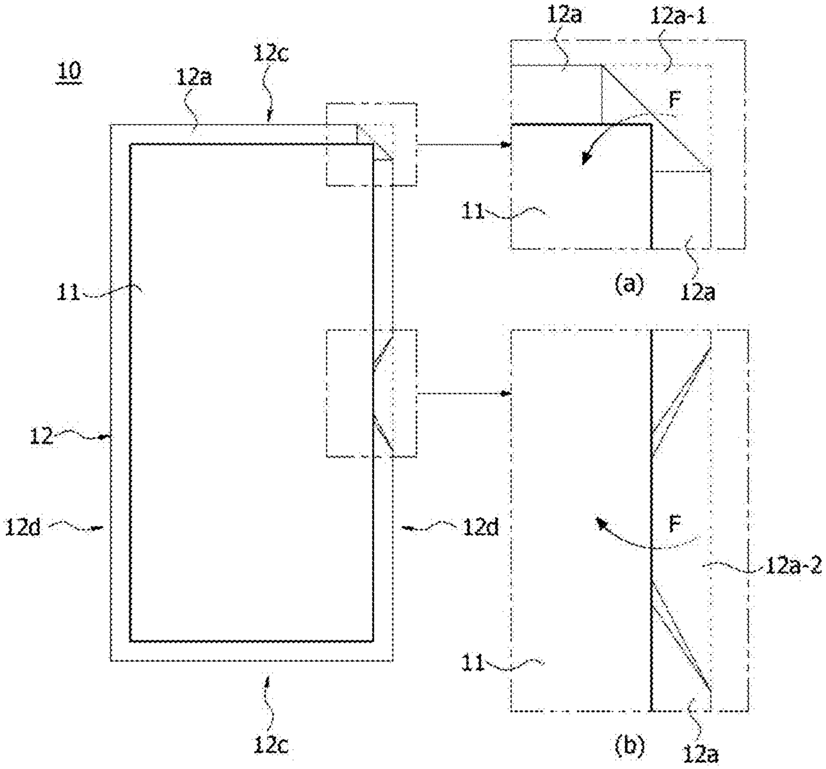
[Figure 2]
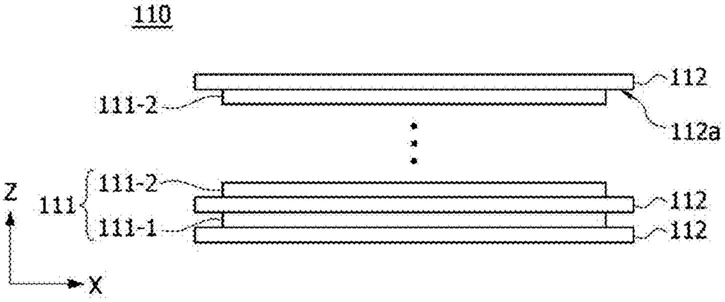

[Figure 3]
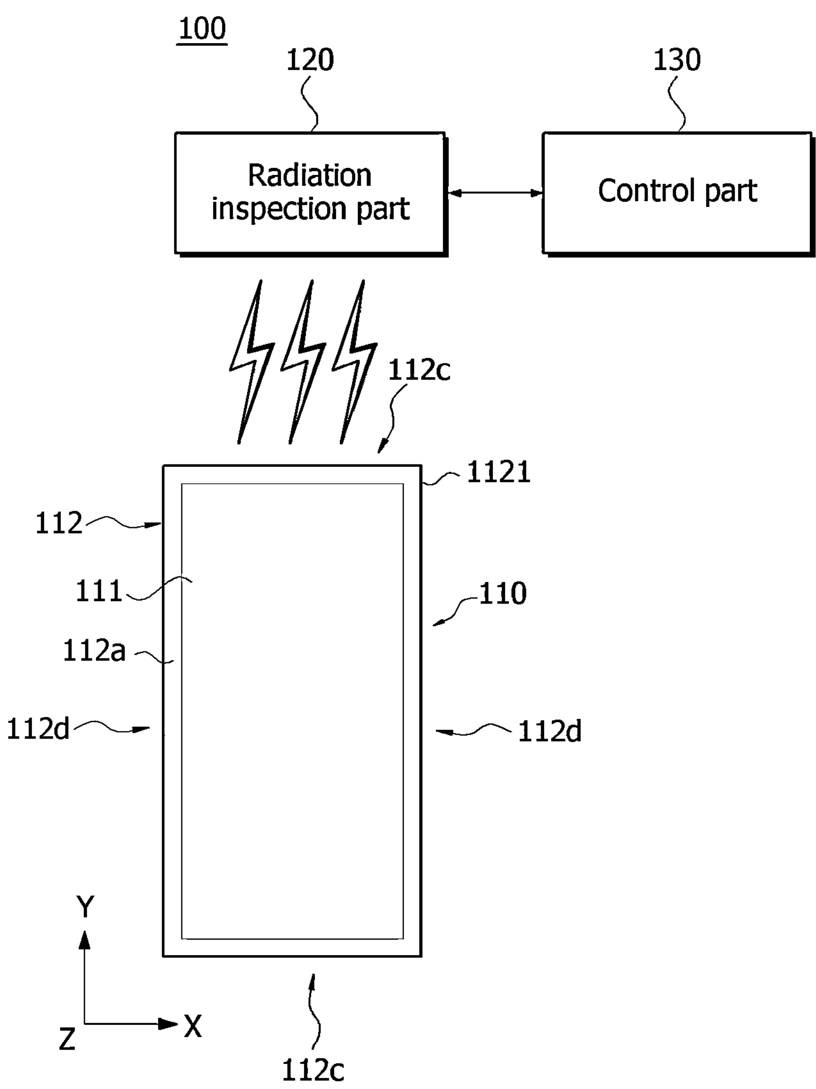

[Figure 4]
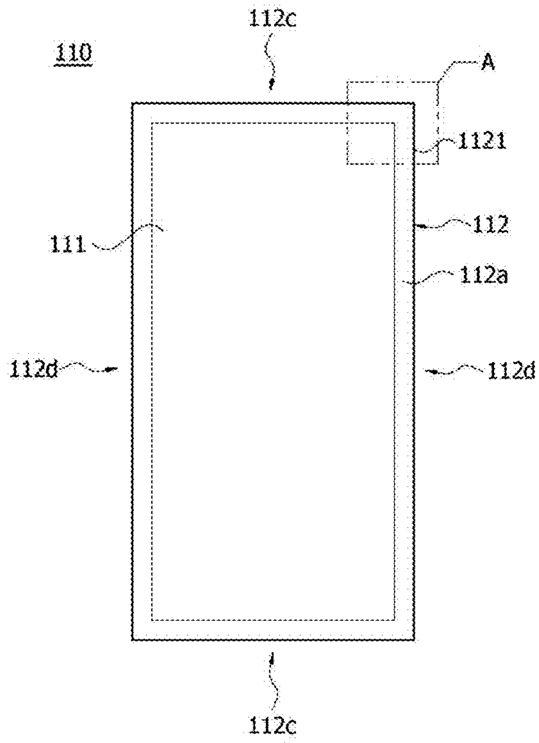
[Figure 5]
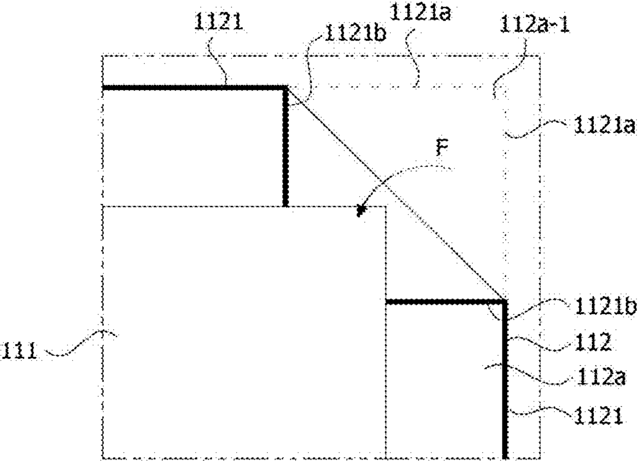

[Figure 6]
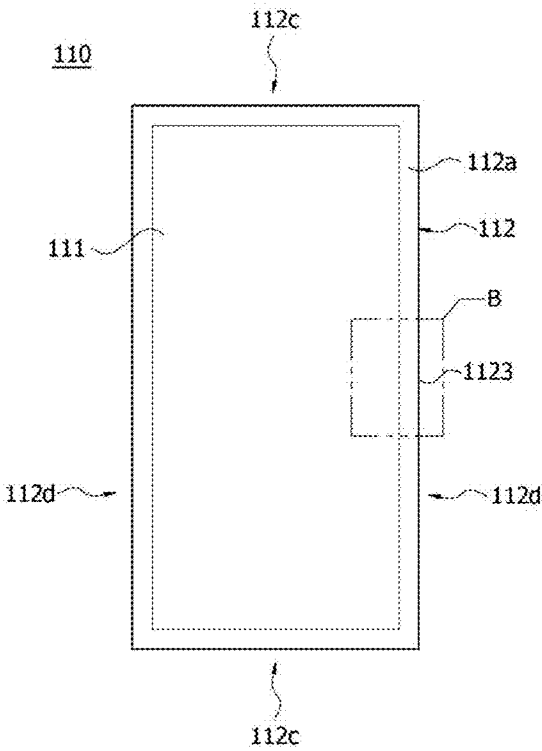
[Figure 7]
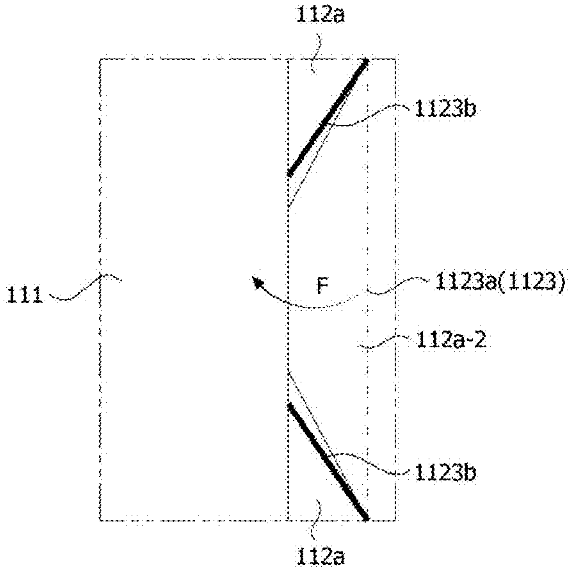

STACK CELL FOR EASY CONFIRMATION OF SEPARATOR FOLDING, SEPARATOR INSPECTION DEVICE AND INSPECTION METHOD

CROSS-REFERENCE TO RELATED APPLICATIONS

The present application is a national phase entry under 35 U.S.C. § 371 of International Application No. PCT/KR2023/020976 filed Dec. 19, 2023, which claims the benefit of Korean Patent Application No. 10-2022-0178139 dated Dec. 19, 2022, each of which disclosures is incorporated herein by reference in its entirety.

FIELD OF THE INVENTION

The present invention relates to a stack cell for easy confirmation of separator folding, a separator inspection device, and an inspection method, which can determine folding of a separator in the stack cell by using image information obtained by irradiating it with radiation rays.

BACKGROUND OF THE INVENTION

In general, as the supply of portable small electrical and electronic devices is spread, development of new type secondary batteries such as nickel-metal hydride batteries and lithium secondary batteries is actively underway.

The lithium secondary battery means a battery using carbon such as graphite as a negative electrode active material, a lithium containing oxide as a positive electrode material, and a non-aqueous solvent as an electrolyte.

Depending on shapes of battery cases, secondary batteries can be classified into a coin-type secondary battery, a rectangular secondary battery, a cylindrical secondary battery, and a pouch-type secondary battery, and the like.

In the secondary battery, electrode assemblies comprising a positive electrode, a negative electrode, and a separator interposed between the positive electrode and the negative electrode are laminated to be accommodated in the battery case. In this way, the electrode assemblies accommodated in the battery case can be classified into, specifically, a jelly-roll type (or wound type) wound by interposing the separator between the positive electrode and the negative electrode in the form of a sheet applied with active materials, a stack type laminating several positive electrodes and negative electrodes sequentially in a state where the separator is interposed therebetween, and a stack/folding type, in which stack-type unit cells are wound by the separator with a long length, and the like.

The stack-type electrode assembly is produced through a process of attaching cut electrodes to a separator using strong heat and pressure through a lamination process to manufacture mono cells, laminating them sequentially, and then finally laminating a half-cell onto the top. Furthermore, to fix the laminated mono cells and half-cell as one unit, a process of attaching a tape at regular intervals may also be performed.

It is necessary to inspect whether the separator is folded in such a stack cell.

FIG. 1 is a diagram for explaining one example in which a separator is folded in a conventional stack cell.

The stack cell (10) includes an electrode (11) and a separator (12) laminated on the electrode (11).

The separator (12) may be formed in a polygonal shape, for example, may have approximately a rectangular shape with long sides (12*d*) and short sides (12*c*)

Referring to FIG. 1, recently, it is confirmed by an inspection method using radiation rays such as X-rays whether the folding of the separator (12) occurs by irradiating the stack cell (10) with radiation rays, and using the photographing object obtained by the irradiated radiation rays.

Typically, the worker visually checks the presence or absence of the folding (F) of the separator (12) from the photographing object obtained by radiation rays.

As one example, as shown in FIG. 1(*a*), in the separator (12), the folding (F) may occur at the corner portion (12*a*-1) between the long side (12*d*) and the short side (12*c*) of the edge region (12*a*). As another example, the separator (12) may be formed in one region of the long side (12*d*) or the short side (12*c*) of the edge region. Particularly, as shown in FIG. 1(*b*), the folding (F) may occur in one region (12*a*-2) on the long side (12*d*) of the edge region (12*a*) of the separator (12).

However, there is a problem that it is difficult to accurately identify whether the folding (F) of the corner portion (12*a*-1) of the edge region (12*a*) or one long side region (12*a*-2) in the separator (12) occurs with the naked eye of the worker through the photographing object.

BRIEF SUMMARY OF THE INVENTION

When folding of a separator is confirmed using radiation rays, it is a technical problem to be solved by the present invention to provide a stack cell for easy confirmation of separator folding, a separator inspection device, and an inspection method that can easily determine the folding occurrence of the separator with the naked eye of the worker.

To solve the above problem, the stack cell according to one example of the present invention comprises an electrode, a separator surrounding the electrode, and a mark formed of a radio-opaque material through which no radiation ray is transmitted, and provided at an edge region of the separator. At this time, the electrode may be a positive electrode or a negative electrode, where in this document, the positive electrode may comprise a positive electrode current collector (e.g., aluminum) and a positive electrode active material coated on the positive electrode current collector, and the negative electrode may comprise a negative electrode current collector (e.g., copper) and a negative electrode active material coated on the negative electrode current collector.

Also, the electrode and the separator laminated on the electrode may form unit cells, and an electrode assembly may be formed by laminating a plurality of unit cells. In addition, the separator has a larger area than that of the electrode, and the electrode is in contact with the central portion of the separator, where in this document, the edge region of the separator represents a portion that is not in contact with the electrode.

Furthermore, in this document, the stack cell may also comprise one or more unit cells, and may also comprise a single unit cell or a plurality of unit cells as laminated.

The mark may be provided so that when the edge region of the separator is folded, it is folded together with the edge region of the separator.

Also, the mark may be provided so that when the separator is folded, at least a partial region is positionally moved along the folding direction of the separator.

In addition, the mark may be provided at a corner portion of the edge region of the separator.

Furthermore, the mark may be provided on the edge region on the long side or short side of the separator.

Also, the mark may be formed continuously along the edge region of the separator.

In addition, the mark may be formed integrally over the entire edge region of the separator.

Furthermore, a plurality of marks may be provided, where the plurality of marks may be formed at different positions in the edge region of the separator, respectively.

In addition, the stack cell according to another example of the present invention comprises a plurality of electrodes, a separator disposed between two adjacent electrodes, and a mark formed of a radio-opaque material through which no radiation ray is transmitted, and provided at an edge region of the separator. Here, the stack cell may comprise a plurality of unit cells, and each unit cell may comprise a separator (also referred to as a 'first separator'), a positive electrode laminated on the first separator, a separator (also referred to as a 'second separator') laminated on the positive electrode, and a negative electrode laminated on the second separator.

At this time, one or more marks may be provided on at least one of the first separator and the second separator.

The mark may be provided so that when the edge region of the separator is folded, it is folded together with the edge region of the separator.

Also, the mark may be provided so that when the separator is folded, at least a partial region is positionally moved along the folding direction of the separator.

In addition, the mark may be provided at a corner portion of the edge region of the separator.

Furthermore, the mark may be provided on the edge region on the long side or short side of the separator.

Also, the mark may be formed continuously along the edge region of the separator.

In addition, the mark may be formed integrally over the entire edge region of the separator.

Furthermore, a plurality of marks may be provided, where the plurality of marks may be formed at different positions in the edge region of the separator, respectively.

Also, a separator inspection device (also referred to as a 'stack cell inspection device') according to another example of the present invention comprises a radiation inspection part provided to irradiate the stack cell with radiation rays, thereby obtaining an image of the radiation ray-irradiated separator, and a control part inspecting folding of the separator by comparing the position information of the mark pre-formed on the separator with the position information of the mark in the image obtained by the radiation inspection part.

In addition, the control part may be provided to output a result of inspecting the folding of the separator to the outside.

Also, a separator inspection method (also referred to as 'stack cell inspection method') according to another example of the present invention may comprise a step (a) of irradiating a stack cell including a separator in which a mark formed of a radio-opaque material is provided at an edge region with radiation rays, a step (b) of obtaining an image of the radiation ray-irradiated separator, and a step (c) of inspecting folding of the separator by comparing the position information of the mark pre-formed on the separator with the position information of the mark shown in the obtained image.

In addition, in the step (a), the mark may be provided so that when the edge region of the separator is folded, it is folded together with the edge region of the separator.

Furthermore, in the step (a), the mark may be provided at a corner portion of the edge region of the separator.

Also, in the step (a), the mark may be provided on the long side edge or the short side edge of the separator.

In addition, in the step (a), a plurality of marks may be provided, where the plurality of marks may be formed at different positions of the edge region of the separator, respectively.

As discussed above, the stack cell for easy confirmation of separator folding, separator inspection device, and inspection method, according to one example of the present invention, have the following effects.

When the folding of the separator is checked in a photographing object photographed by irradiating it with radiation rays, it is possible to easily determine the folding of the separator through the position information of the mark through which no radiation ray is transmitted.

In addition, as defective stack cells with folded separators are easily inspected, it is possible to improve manufacturing reliability of secondary batteries.

BRIEF DESCRIPTION OF THE DRAWINGS

FIGS. 1, 1(*a*), and 1(*b*) are diagrams for explaining one example in which a separator is folded in a conventional stack cell.

FIG. 2 is a schematic diagram of a stack cell.

FIG. 3 is a configuration diagram schematically showing a separator inspection device according to one example of the present invention.

FIG. 4 is a plan view showing one example of a stack cell for easy confirmation of separator folding.

FIG. 5 is an enlarged diagram showing an example in which folding occurs in the portion A shown in FIG. 4.

FIG. 6 is a plan view showing another example of a stack cell for easy confirmation of separator folding.

FIG. 7 is an enlarged diagram showing an example in which folding occurs in the portion B shown in FIG. 6.

DETAILED DESCRIPTION

Hereinafter, the stack cell (110) for easy confirmation of separator folding, the separator inspection device (100), and the separator inspection method, according to one example of the present invention, will be described in detail with reference to the attached drawings.

In addition, regardless of the reference numerals, the same or corresponding components are given by the same or similar reference numerals, duplicate descriptions thereof will be omitted, and for convenience of explanation, the size and shape of each component member as shown can be exaggerated or reduced.

The stack cell (110) for easy confirmation of separator folding, and the separator inspection device (100) and method, according to an example of the present invention, may be performed before performing a stacking process after performing electrode plate notching/punching during a process of manufacturing a pouch-type secondary battery.

FIG. 2 is a schematic diagram of a stack cell (110), and FIG. 3 is a configuration diagram schematically showing a separator inspection device (100) according to one example of the present invention.

The stack cell (110) may comprise one or more unit cells. As one example, the unit cell may also comprise an electrode (111) and a separator (112) laminated on the electrode (111). The electrode (111) may be a positive electrode or a negative electrode. As another example, it may also comprise a plurality of electrodes (111-1, 111-2) and a separator (112) interposed between two adjacent electrodes (111-1, 111-2). For example, referring to FIG. 2, it may comprise a separator (112, also referred to as a 'first separator'), a positive electrode (111-1) laminated on the first separator, a separator (112, also referred to as a 'second separator') laminated on the positive electrode (111-1), and a negative electrode (111-2) laminated on the second separator (112).

Also, the stack cell (110) may be an electrode assembly in which a plurality of unit cells with a separator (112) interposed between the positive electrode (111-1) and the negative electrode (111-2) are laminated in a stack structure.

In addition, the separator (112) has a larger area than that of the electrode (111: 111-1, 111-2), where the electrode (111) may be in contact with the central portion of the separator (112). In this document, in the stack cell (110), the edge region (112*a*) of the separator (112) represents a portion that is not in contact with the electrode (111-1, 111-2).

Referring to FIG. 3, as one example, the stack cell (110) may comprise at least one electrode (111) and a separator (112) surrounding the electrode (111). The electrode (111) may be a positive electrode or a negative electrode.

In this document, the z-axis direction represents the lamination direction of the stack cell (110), the x-axis direction represents a direction parallel to the short side of the stack cell (or separator), and the y-axis direction represents a direction parallel to the long side of the stack cell (or separator).

FIG. 4 is a plan view showing one example of a stack cell for easy confirmation of separator folding, and FIG. 5 is an enlarged diagram showing an example in which folding occurs in the portion A shown in FIG. 4.

In addition, FIG. 6 is a plan view showing another example of a stack cell for easy confirmation of separator folding, and FIG. 7 is an enlarged view showing an example in which folding occurs in the portion B shown in FIG. 6.

The separator (112) may have a polygonal shape, and for example, as shown in FIG. 3, the separator (112) may have approximately a rectangular shape with long sides (112*d*) and short sides (112*c*). The edge region (112*a*) of the separator (112) may include edge regions on the long sides (112*d*) and edge regions on the short sides (112*c*).

In such a stack cell (110), one or more marks (1121, 1123) may be formed at positions preset on the separator (112). The marks (1121, 1123) may be provided on the separator (112).

At this time, the marks (1121, 1123) may be generally provided at the edge region (112*a*) where folding (F) of the separator (112) occurs frequently.

Referring to FIGS. 4 and 5, the mark (1121) may be provided at the corner portion (112*a*-1) of the edge region (112*a*) of the separator (112). In this instance, the corner portion (112*a*-1) means a boundary region between the long side (112*d*) and the short side (112*c*) of the separator (112).

Referring to FIGS. 6 and 7, the mark (1123) may be provided in one region of the long side (112*d*) or the short side (112*c*), which is not the corner portion (112*a*-1) formed between the long side (112*d*) and the short side (112*c*) of the edge region (112*a*) of the separator (112). For example, the mark (1123) may be provided in one region (112*a*-2) of the long side (112*d*) in the edge region (112*a*) of the separator (112).

Referring to FIGS. 4 to 7, it has been shown that the mark (1121, 1123) is provided only at any one position of the corner portion (112*a*-1) and one region (112*a*-2) of the long side, which are different positions of the edge region (112*a*) of the separator (112), but the marks (1121, 1123) may also be provided at both the corner portion (112*a*-1) of the edge region (112*a*) of the separator (112) and one region (112*a*-2) of the long side (112*d*), respectively.

Also, the mark (1121, 1123) may also be formed continuously along the edge region (112*a*) of the separator (112). That is, the mark (1121, 1123) may have a shape extended by a predetermined length, or may have a shape extended by a predetermined length along the longitudinal direction of the long side (112*d*) or the short side (112*c*).

In addition, when the mark (1121) is provided on the corner portion (112*a*-1) of the edge region (112*a*) of the separator (112), the mark (1121) may have a shape extended to the long side (112*d*) and the short side (112*c*) connected to the corner portion (112*a*-1), respectively, by each predetermined length.

Furthermore, the mark (1121, 1123) may also be formed integrally over the entire edge region (112*a*) of the separator (112).

In this way, the position of the mark (1121, 1123) formed on the separator (112) may be changed, which is not limited to the above-described examples.

Also, the mark (1121, 1123) may be provided on one side (surface) of the edge region of the separator (112).

For example, when a plurality of separators (112) is laminated in the stack cell (110), the marks (1121, 1123) may also be provided on one or more separators (112), or may also be provided on each of the plurality of separators (112).

The mark (1121, 1123) may be made of a radio-opaque material so that the radiation rays irradiated from the radiation inspection part (120) are not transmitted.

The mark (1121, 1123) may be made of a metal material, such as copper (Cu), which is a material through which no radiation ray is transmitted, but is not necessarily limited thereto, which may be formed of a material having radio-opaque characteristics and having chemical stability inside the stack cell (110).

Also, the marks (1121, 1123) may be formed on the separator (112) in a method of transferring or applying a radio-opaque material. The mark (1121, 1123) may be provided on the separator (112) before being laminated into the stack cell (110). That is, the stack cell (110) may be manufactured by laminating the separator (112) on which the mark (1121, 1123) is formed.

In addition, the mark (1121, 1123) may be provided so that when the edge region of the separator (112) is folded, it is folded together with the edge region (112*a*) of the separator (112).

Furthermore, the mark (1121, 1123) may be provided so that when the separator (112) is folded, at least a partial region is positionally moved along the folding direction of the separator (112).

The separator inspection device (100) and inspection method according to one example of the present invention may be used to inspect the presence or absence of the folding of the separator (112) in the stack cell (110) by irradiating the stack cell (110) with radiation rays.

Referring to FIG. 3, the separator inspection device (100) according to one example of the present invention may comprise a radiation inspection part (120) irradiating the stack cell (110), on which the mark (1121, 1123) is formed, with radiation rays and obtaining an image of the radiation ray-irradiated separator (112), and a control part (130) inspecting folding of the separator (112) using the obtained image.

The radiation inspection part (120) irradiates the stack cell (110), on which the mark (1121, 1123) is formed, with radiation rays. In addition, the radiation inspection part (120) may irradiate the stack cell (110), on which the mark (1121, 1123) is formed, with radiation rays such as X-rays, and obtain an image of the radiation ray-irradiated separator (112).

At this time, the mark (1121, 1123) may be made of a radio-opaque material so that the radiation rays irradiated from the radiation inspection part (120) are not transmitted.

At this time, even if the stack cell (110) is irradiated with radiation rays from the radiation irradiation part (120), they do not transmit the mark (1121, 1123) formed on the separator (112).

In this case, as the separator (112) is folded (F), the mark (1121, 1123) is moved along the folding direction of the separator (112) from the first position (1121*a*, 1123*a*) and displayed at the second position (1121*b*, 1123*b*) in the image obtained by the radiation inspection part (120). In this document, the first position (1121*a*, 1123*a*) represents the initial position where the mark is formed in a state that the separator is not folded, and the second position (1121*b*, 1123*b*) represents the changed position of the mark folded together with the edge region of the separator along the folding direction of the separator (112).

Referring to FIGS. 4 to 7, when the separator (112) is folded (F), the mark (1121, 1123) may be displayed at second position (1121*b*, 1123*b*) depending on the folded state of the separator (112). In general, the separator (112) is folded toward the electrode (111), so that the mark (1121, 1123) may be displayed at the second position (1121*b*, 1123*b*) where at least a partial region overlaps the electrode (111) along the direction where the separator (112) is folded.

Ultimately, the worker can easily determine the presence or absence of folding of the separator (112) through the positions of the mark (1121, 1123) in the image obtained by the radiation inspection part (120).

In addition, the control part (130) may inspect and determine the folding (F) of the separator (112) by comparing the position information of the mark (1121, 1123) previously formed on the separator (112) with the position information of the mark (1121, 1123) in the image obtained by the radiation inspection part (120).

Meanwhile, the control part (130) may determine the folding of the separator (112) using a machine learning technique.

In general, the machine learning technique means algorithms in which a computer learns and make predictions based on data input by users.

In addition, the control part (130) may also generate a notification corresponding to the folded state of the separator (112) to the worker by outputting the determined result to the outside.

Hereinafter, with reference to FIGS. 2 to 7, a separator inspection method according to one example of the present invention will be briefly described.

First, it comprises a step of laminating an electrode (111) and a separator (112) on the electrode (111) to form a stack cell (110). In addition, a mark (1121, 1123) is provided at the edge region (112*a*) of the separator (112).

As described above, the mark (1121, 1123) may be formed at various positions in the edge region (112*a*) of the separator (112).

In addition, the mark (1121, 1123) may be formed at various positions in the edge region (112*a*) of the separator (112) by a method of transferring or applying a material through which no radiation ray is transmitted.

The inspection method may comprise a step (a) of irradiating a stack cell (110) including a separator in which a mark is provided at an edge region with radiation rays, a step (b) of obtaining an image of the radiation ray-irradiated separator (112), and a step (c) of inspecting folding of the separator (112) by comparing the position information of the mark (1121, 1123) pre-formed on the separator (112) with the position information of the mark (1121, 1123) shown in the obtained image.

The step (a) irradiates the separator (112) of the stack cell (110) with radiation rays using the radiation inspection part (120) of the separator inspection device (100).

Then, the image of the radiation ray-irradiated separator (112) is obtained (step b).

In the image of the separator (112) obtained in the step (b), the mark (1121, 1123) may also be displayed at the preset first position (1121*a*, 1123*a*), and may also be displayed at the second position (1121*b*, 1123*b*).

Then, the folding of the separator (112) is inspected by comparing the position information of the mark (1121, 1123) (step c).

In the step (c), the position information of the pre-formed mark (1121, 1123) of the separator (112) is compared with the position information of the mark (1121, 1123) shown in the obtained image.

At this time, the radiation rays irradiated through the radiation inspection part (120) do not transmit the mark (1121, 1123) previously formed on the separator (112), so that when the separator (112) is folded, in the image information obtained by the radiation inspection part (120), the mark (1121, 1123) may appear to be displayed at the second position (1121*b*, 1123*b*) rather than the first position (1121*a*, 1123*a*) along the folding direction of the separator (112).

In addition, in the step (c), by comparing the position information of the mark (1121, 1123) formed on the separator (112) through the control part (130), and inspecting and determining the folding of the separator (112) through the compared position information, it possible to identify defects in the separator (112).

For example, when the mark (1121, 1123) is displayed at the first position (1121*a*, 1123*a*) in the image obtained by the radiation inspection part (120), it can be determined that the separator (112) is not folded, and it can be identified that the separator (112) is normal. On the contrary, when the mark (1121, 1123) is displayed at the second position (1121*b*, 1123*b*) in the image obtained by the radiation inspection part (120), it can be identified that the separator (112) is defective by determining that the separator (112) is folded.

The preferred examples of the present invention as described above have been disclosed for illustrative purposes, and those skilled in the art having ordinary knowledge of the present invention will be able to make various modifications, changes, and additions within the spirit and scope of the present invention, and such modifications, changes, and additions should be regarded as falling within the scope of the following claims.

INDUSTRIAL APPLICABILITY

According to the stack cell for easy confirmation of separator folding, the separator inspection device, and the inspection method, according to an embodiment of the present invention, it is possible to easily determine folding of a separator from a photographing object photographed by irradiating it with radiation rays.

The invention claimed is:

1. A stack cell comprising:
a plurality of electrodes;
a separator disposed between two adjacent electrodes; and
a mark formed of a radio-opaque material through which no radiation ray is transmitted, and provided at an edge region of the separator,
wherein the mark is provided so that when the edge region of the separator is folded, the mark is folded together with the edge region of the separator.

2. The stack cell according to claim 1, wherein
the mark is provided so that when the separator is folded, at least a partial region is positionally moved along the folding direction of the separator.

3. The stack cell according to claim 1, wherein
the mark is provided at a corner portion of the edge region of the separator.

4. The stack cell according to claim 1, wherein
the mark is provided on the edge region on the long side or short side of the separator.

5. The stack cell according to claim 1, wherein
the mark is formed continuously along the edge region of the separator.

6. The stack cell according to claim 1, wherein
the mark is formed integrally over the entire edge region of the separator.

7. The stack cell according to claim 1, wherein
the mark comprises a plurality of marks,
wherein the plurality of marks is formed at different positions in the edge region of the separator, respectively.

8. A separator inspection device comprising:
a radiation inspection part configured to irradiate the stack cell according to claim 1 with radiation rays, thereby obtaining an image of the radiation ray-irradiated separator; and
a control part configured for inspecting folding of the separator by comparing the position information of the mark pre-formed on the separator with the position information of the mark in the image obtained by the radiation inspection part.

9. The separator inspection device according to claim 8, wherein
the control part is configured to output a result of inspecting the folding of the separator.

10. A separator inspection method comprising:
a step (a) of irradiating a stack cell including a separator in which a mark formed of a radio-opaque material is provided at an edge region with radiation rays;
a step (b) of obtaining an image of the radiation ray-irradiated separator; and
a step (c) of inspecting folding of the separator by comparing the position information of the mark pre-formed on the separator with the position information of the mark shown in the obtained image.

11. The separator inspection method according to claim 10, wherein in the step (a),
the mark is provided so that when the edge region of the separator is folded, the mark is folded together with the edge region of the separator.

12. The separator inspection method according to claim 10, wherein in the step (a),
the mark is provided at a corner portion of the edge region of the separator.

13. The separator inspection method according to claim 10, wherein in the step (a),
the mark is provided on the long side edge or the short side edge of the separator.

14. The separator inspection method according to claim 10, wherein in the step (a),
the mark comprises a plurality of marks,
wherein the plurality of marks is formed at different positions of the edge region of the separator, respectively.

* * * * *